(12) United States Patent
Lukac (10) Patent No.: US 7,889,245 B2
(45) Date of Patent: Feb. 15, 2011

(54) AUTOMATIC WHITE BALANCING OF A DIGITAL IMAGE

(75) Inventor: Rastislav Lukac, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 595 days.

(21) Appl. No.: 11/972,435

(22) Filed: Jan. 10, 2008

(65) Prior Publication Data

US 2008/0170160 A1      Jul. 17, 2008

Related U.S. Application Data

(60) Provisional application No. 60/884,774, filed on Jan. 12, 2007, provisional application No. 60/911,553, filed on Apr. 13, 2007.

(51) Int. Cl.
*H04N 9/73*      (2006.01)

(52) U.S. Cl. .................................... 348/223.1; 358/516

(58) Field of Classification Search ............... 348/223.1
See application file for complete search history.

(56) References Cited

U.S. PATENT DOCUMENTS

| | | | |
|---|---|---|---|
| 5,223,921 A | 6/1993 | Haruki et al. | |
| 6,069,972 A | 5/2000 | Durg et al. | |
| 6,181,374 B1 | 1/2001 | Saito et al. | |
| 6,268,940 B1 | 7/2001 | Saarelma et al. | |
| 6,642,962 B1 | 11/2003 | Lin et al. | |
| 6,788,339 B1 | 9/2004 | Ikeda | |
| 6,791,606 B1 | 9/2004 | Miyano | |
| 6,795,115 B1 | 9/2004 | Okazaki | |
| 6,876,384 B1 | 4/2005 | Hubina et al. | |
| 6,952,503 B2 | 10/2005 | Matsuura | |
| 7,030,913 B2 | 4/2006 | Ikeda | |
| 7,081,919 B2 | 7/2006 | Jaspers | |
| 7,126,644 B2 * | 10/2006 | Xia et al. .................... | 348/655 |
| 7,162,078 B2 | 1/2007 | Cheng | |
| 7,184,080 B2 * | 2/2007 | Kehtarnavaz et al. .... | 348/223.1 |
| 7,199,821 B2 | 4/2007 | Miyao et al. | |

(Continued)

FOREIGN PATENT DOCUMENTS

EP       0530793 A2      3/1993

(Continued)

OTHER PUBLICATIONS

Refined Automatic White Balancing, Rastislav Lukac, Electronics Letters, Apr. 12, 2007, vol. 43, No. 8.

*Primary Examiner*—Ngoc-Yen T Vu
(74) *Attorney, Agent, or Firm*—Mark P. Watson (57) ABSTRACT

Automatic white balancing of a digital image. In one example embodiment, a method for automatic white balancing of a full-color input image includes several acts. First, pixels of the input image are selected according to one or more predetermined criteria. Next, global gain values for R and B components of the input image are determined using the selected pixels. Then, local gain values for the R and B components of each individual pixel of the input image are determined based on characteristics of each individual pixel. Next, a final gain value for the R and B components of each individual pixel of the input image is determined based on contributions of the local and global gain values. Finally, a white-balanced output image is produced by adjusting the R and B components of each pixel in the input image using the corresponding final gain value.

23 Claims, 2 Drawing Sheets

U.S. PATENT DOCUMENTS

| | | |
|---|---|---|
| 7,256,828 B2 | 8/2007 | Nilsson et al. |
| 7,394,930 B2 * | 7/2008 | Trimeche et al. ............ 382/167 |
| 2002/0122120 A1 | 9/2002 | Hsieh |
| 2003/0184659 A1 | 10/2003 | Skow |
| 2003/0222992 A1 | 12/2003 | Kaplinsky et al. |
| 2003/0223001 A1 | 12/2003 | Maeda et al. |
| 2004/0085458 A1 | 5/2004 | Yanof et al. |
| 2004/0212691 A1 | 10/2004 | Sato |
| 2005/0286097 A1 | 12/2005 | Hung et al. |
| 2006/0053374 A1 | 3/2006 | Wilensky |
| 2006/0152603 A1 | 7/2006 | Enge et al. |
| 2006/0153444 A1 | 7/2006 | Trimeche et al. |
| 2006/0274160 A1 | 12/2006 | Cheng |
| 2007/0052813 A1 | 3/2007 | Neter |
| 2007/0159536 A1 | 7/2007 | Lin |

FOREIGN PATENT DOCUMENTS

| | | |
|---|---|---|
| EP | 1489852 A2 | 12/2004 |
| JP | 07154814 | 6/1995 |
| JP | 10243414 | 9/1998 |
| JP | 2000102030 | 4/2000 |
| JP | 2001136539 | 5/2001 |
| JP | 2003143622 | 5/2003 |
| JP | 2004166310 | 6/2004 |
| JP | 2006013745 | 1/2006 |
| WO | 2006028460 | 3/2006 |

\* cited by examiner

AUTOMATIC WHITE BALANCING OF A DIGITAL IMAGE

CROSS-REFERENCE TO RELATED APPLICATION

This application claims priority to U.S. Provisional Patent Application Ser. No. 60/884,774, filed on Jan. 12, 2007, and to U.S. Provisional Patent Application Ser. No. 60/911,553, filed on Apr. 13, 2007, each of which is incorporated herein by reference in its entirety.

THE FIELD OF THE INVENTION

The invention relates to digital image processing. More specifically, embodiments of the invention relate to methods for automatic white balancing of a digital image.

BACKGROUND

A digital image is a representation of a two-dimensional analog image as a finite set of pixels. Digital images can be created by a variety of devices, such as digital cameras, scanners, and various other computing devices. Digital image processing is the use of computer algorithms to perform image processing on digital images. Image processing operations include, for example, demosaicking, color to grayscale conversion, color adjustment, intensity adjustment, scene analysis, object recognition, white balancing and others.

White balancing refers to the process of adjusting the color in a digital image in order to compensate for color shifts due to scene illumination. White balancing solutions are needed because depending on the illumination or light source of a scene captured in a digital image, color in the captured image can be shifted from the perceived color in the scene. When performed properly, white balancing can be used to produce a visually pleasing white-balanced variant of a digital image.

One problem with many conventional white balancing applications and algorithms is that they are often very computationally intensive. As such, such applications might require the use of relatively expensive computational resources to execute efficiently, which can be prohibitively expensive. In addition, such applications can be very time-consuming to execute—a problem which is exacerbated depending on the computing resources used. Further, such applications can be very difficult to design and implement. Thus, an image processing application/algorithm that could be implemented and executed in a more efficient manner, and in a manner that requires less computational resources, would greatly increase the application's practical value.

SUMMARY OF EXAMPLE EMBODIMENTS

In general, example embodiments relate to methods for automatic white balancing of a digital image. Example embodiments can be used to produce a visually pleasing white-balanced variant of a digital image. At least one advantage of example embodiments is that they are relatively computationally efficient and simple to implement in hardware and/or software, and thus require less processing time and/or processing resources than many conventional white balancing applications.

In a first example embodiment, a method for automatic white balancing of a full-color input image includes several acts. First, pixels of the input image are selected according to one or more predetermined criteria. Next, global gain values for R and B components of the input image are determined using the selected pixels. Then, local gain values for the R and B components of each individual pixel of the input image are determined based on characteristics of each individual pixel. Next, a final gain value for the R and B components of each individual pixel of the input image is determined based on contributions of the local and global gain values. Finally, a white-balanced output image is produced by adjusting the R and B components of each pixel in the input image using the corresponding final gain value.

In a second example embodiment, a method for automatic white balancing of a full-color input image includes several acts. First, pixels of the input image are selected according to one or more predetermined criteria. Next, a global reference color vector of the input image is determined using the selected pixels. Then, a final gain value for the R and B components of each individual pixel of the input image is determined by combining both the global reference color vector and a local color vector corresponding to the individual pixel. Finally, a white-balanced output image is produced by adjusting the R and B components of each pixel in the input image using the corresponding final gain value.

In a third example embodiment, a method for automatic white balancing of an input image includes several acts. Unlike the methods presented in the previous two embodiments which operate on full-color data obtained, for example, from a three-sensor digital camera or by demosaicking the data captured by a single-sensor camera, the method in this embodiment operates on mosaic single-sensor data or on a color filter array (CFA) single-sensor image. First, pixels of the input image are selected according to one or more predetermined criteria. Next, global spectral characteristics of the input image are determined using color component-wise averaging of the selected pixels. Then, global gain values are determined as a function of mean chrominance and luminance values. Next, local spectral characteristics of the input image are determined using samples from a neighborhood of a pixel under consideration and estimating a local luminance component in chrominance locations. Then, local gain values are determined as a function of the local luminance component and the pixel under consideration. Next, final gain values for the chrominance components of the input image are determined based on contributions of the local and global gain values. Finally, a white-balanced output image is produced by adjusting the input image components using the corresponding final gain values.

In a fourth example embodiment, one or more computer-readable media have computer-readable instructions thereon which, when executed, implement the method for automatic white balancing of a full-color input image discussed above in connection with the first example embodiment.

In a fifth example embodiment, one or more computer-readable media have computer-readable instructions thereon which, when executed, implement the method for automatic white balancing of a full-color input image discussed above in connection with the second example embodiment.

In a sixth example embodiment, one or more computer-readable media have computer-readable instructions thereon which, when executed, implement the method for automatic white balancing of an input CFA single-sensor image discussed above in connection with the third example embodiment.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further develop the above and other aspects of example embodiments of the invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention. Example embodiments of the invention will be disclosed and explained with additional specificity and detail through the use of the accompanying drawings in which.

DETAILED DESCRIPTION OF EXAMPLE EMBODIMENTS

In general, example embodiments relate to methods for automatic white balancing of a digital image. Example embodiments can be used to produce a visually pleasing white-balanced variant of a digital image.

Figure 1:
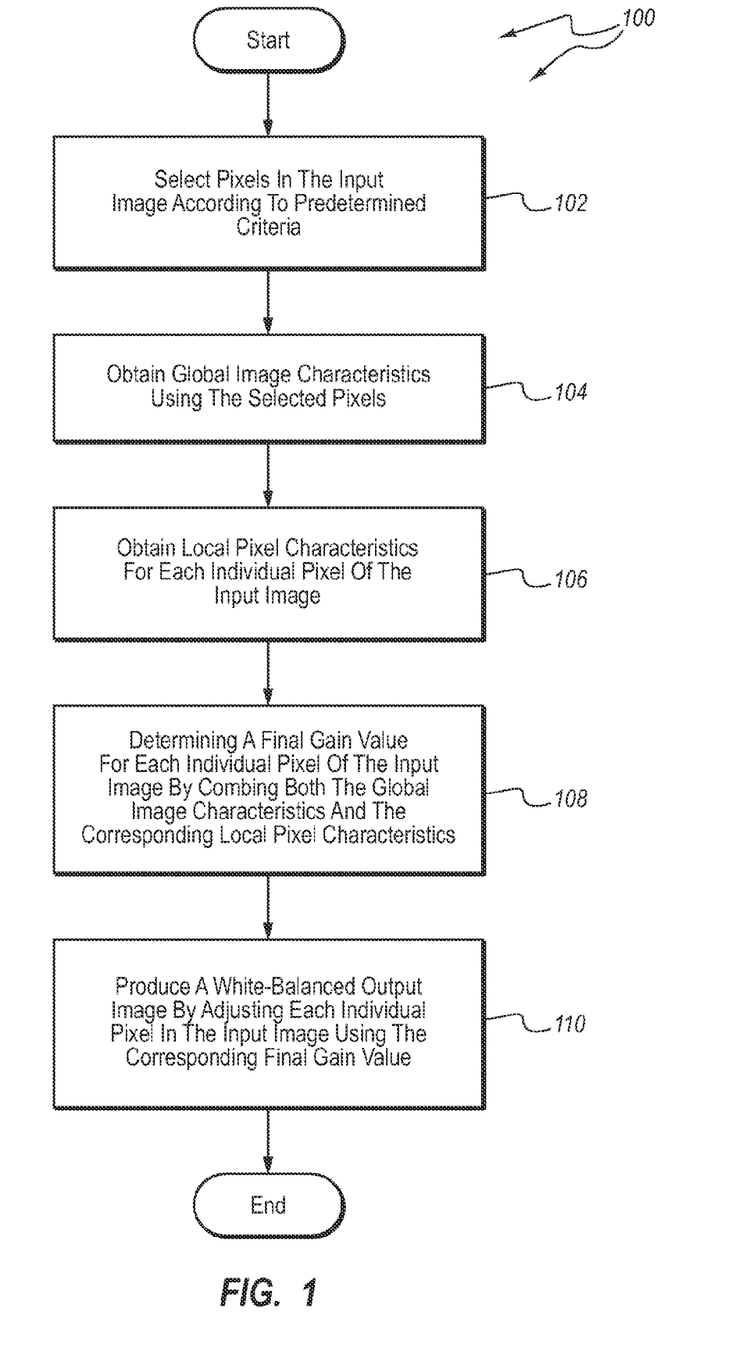
FIG. 1 discloses an example method for automatic white balancing of a digital image.

With reference now to FIG. 1, an example method 100 for automatic white balancing of a digital image is disclosed. More particularly, the example method 100 converts each pixel of an input image to a pixel with enhanced coloration in an output (white-balanced) color image.

The example method 100 and variations thereof disclosed herein can be implemented using computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store program code in the form of computer-executable instructions or data structures and which can be accessed by a processor of a general purpose or special purpose computer. Combinations of the above should also be included within the scope of computer-readable media.

Computer-executable instructions comprise, for example, instructions and data which cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing devices such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners, copiers, portable photo viewers (examples of which include, but are not limited to, the Epson P-3000 or P-5000 portable photo viewers manufactured by Seiko Epson Corporation), or portable movie players, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser CX11NF manufactured by Seiko Epson Corporation) or a digital camera/camcorder combination. An image processing device may include automatic white-balancing capability, for example, to automatically white-balance a digital image in order to enhance the coloration of the image. For example, a camera with this automatic white-balancing capability may include one or more computer-readable media that implement the example method 100, or a computer connected to the camera may include one or more computer-readable media that implement the example method 100.

Figure 2:
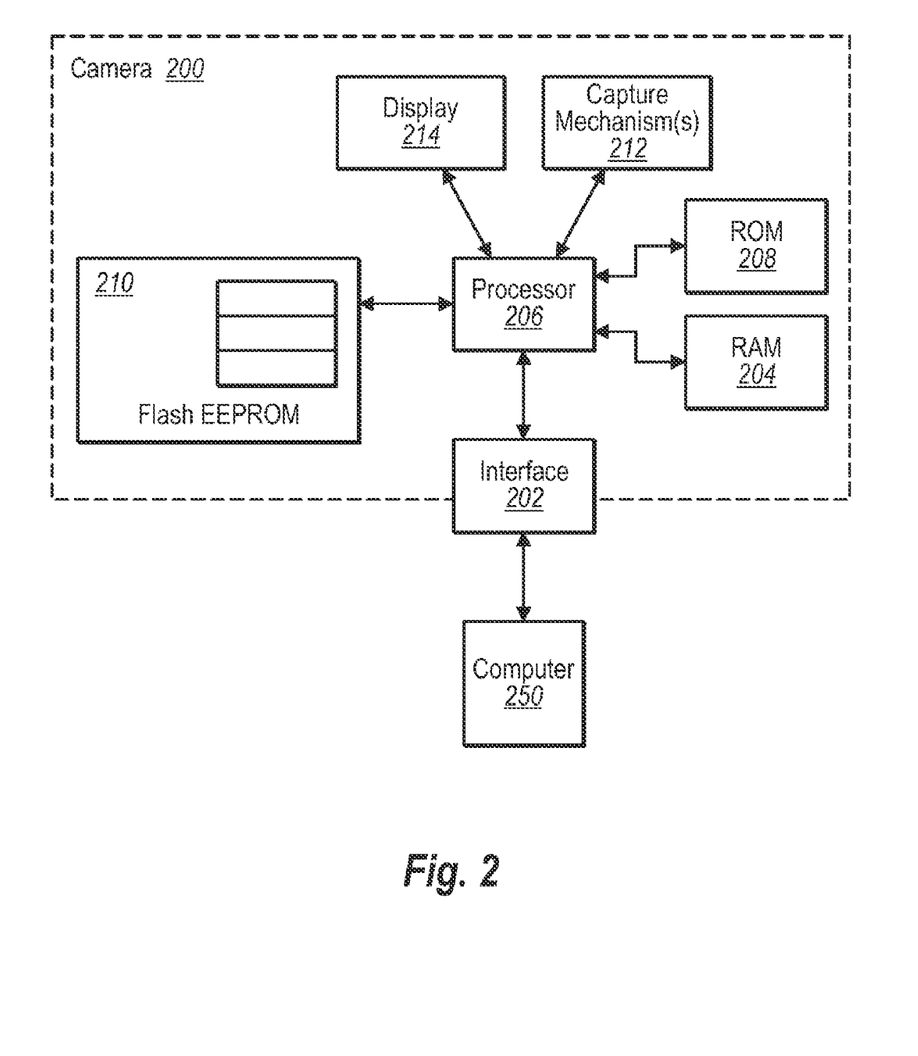
FIG. 2 is a schematic representation of an example camera.

A schematic representation of an example camera 200 is disclosed in FIG. 2. The example camera 200 exchanges data with a host computer 250 by way of an intervening interface 202. Application programs and a camera driver may also be stored for access on the host computer 250. When an image retrieve command is received from the application program, for example, the camera driver controls conversion of the command data to a format suitable for the camera 200 and sends the converted command data to the camera 200. The driver also receives and interprets various signals and data from the camera, and provides necessary information to the user by way of the host computer 250.

When data is sent by the host computer 250, the interface 202 receives the data and stores it in a receive buffer forming part of a RAM 204. The RAM 204 can be divided into a number of sections, for example through addressing, and allocated as different buffers, such as a receive buffer or a send buffer. Data, such as digital image data, can also be obtained by the camera from the capture mechanism(s) 212. For example, the capture mechanism(s) 212 can generate a digital photographic image of a real-world scene. This digital image can then be stored in the receive buffer or the send buffer of the RAM 204.

A processor 206 uses computer-executable instructions stored on a ROM 208 or on a flash EEPROM 210, for example, to perform a certain function or group of functions, such as the method 100 for example. Where the data in the receive buffer of the RAM 204 is a digital image, for example, the processor 206 can implement the methodological acts on the digital image of the method 100 to automatically white balance the digital image. Further processing in an imaging pipeline may then be performed on the white-balanced digital image before the digital image is displayed by the camera 200 on a display 214, such as an LCD display for example, or transferred to the host computer 250, for example.

It is understood that digital images may be received by the camera 200 from sources other than the computer 250 and the capture mechanism(s) 212, including, but not limited to, the flash EEPROM 210 or the ROM 208. An example embodiment of the camera 200 includes, but is not limited to, the Epson R-D1 Digital Camera manufactured by Seiko Epson Corporation.

The example method 100 for automatic white balancing of a digital image will now be discussed in connection with FIG.

1. Prior to performing the method 100, a digital image made up of pixels having R, G, and/or B components can be targeted for various image processing operations such as noise filtering and edge enhancement.

The example method 100 can operate on either full-color data, such as red-green-blue (RGB) data (see first and second example embodiments below), or on gray-scale or mosaic data, such as color filter array (CFA) data (see third example embodiment below). In a typical consumer-grade digital camera with a single sensor CFA, a full-color image is obtained by an image processing solution known as demosaicking. Thus, in a single-sensor CFA digital camera imaging pipeline, the example method 100 may either be employed before or after a digital image has been demosaicked into a full-color digital image. However, the example method 100 can also be employed in other camera architectures. For example, in three-sensor digital cameras, the example method 100 may be employed before or after the signals from the three sensors are registered to produce a full-color digital image.

For example, operating on full-color data, the example method 100 transforms an input image X with $K_1$ rows and $K_2$ columns to an output, enhanced image Y of the same dimensions. Thus, each pixel $x_{(r,s)} = [x_{(r,s)1}, x_{(r,s)2}, x_{(r,s)3}]^T$ in the image X, where r=1, 2, ..., $K_1$ and s=1, 2, ..., $K_2$ denote, respectively, the image row and column, is transformed onto a white-balanced pixel $y_{(r,s)} = [y_{(r,s)1}, y_{(r,s)2}, y_{(r,s)3}]^T$ in the image Y. Note that in the above pixel notation, $x_{(r,s)k}$ and $y_{(r,s)k}$ denote R (for k=1), G (for k=2), and B (for k=3) components.

At 102, pixels of the input image are selected according to one or more predetermined criteria. At 104, global image characteristic are obtained using the pixels selected at 102. At 106, local pixel characteristics are obtained for each individual pixel of the input image. At 108, a final gain value is determined for each individual pixel of the input image by combining both the global image characteristics and the corresponding local pixel characteristics. Then, at 110, a white-balanced output image is produced by adjusting each individual pixel in the input image using the corresponding final gain value. Since the local gain values are directly obtained by using the spectral (color) characteristics of the pixel under consideration, the method 100 is computationally efficient and easy to implement.

I. First Example Embodiment

A first example embodiment of the method 100 will now be disclosed in connection with FIG. 1. At 102, pixels of the input image are selected according to one or more predetermined criteria. For example, one criterion in the example method 100 may be to detect white areas and adjust the input image according to the characteristics of the white areas. In order to detect white areas, each pixel of the input image may be compared with a predetermined threshold η. Other possible criteria for selecting pixels at 102 may include selecting pixels that represent gray areas, or simply selecting all pixels of the input image.

At 104, global gain values are determined for the R and B (chrominance) components of the input image using the selected pixels. For example, the threshold η can be used to obtain a global color vector $\bar{x} = [\bar{x}_1, \bar{x}_2, \bar{x}_3]^T$ with the components $\bar{x}_k$ defined as follows:

$$\bar{x}_k = \left( \sum_{r=1}^{K_1} \sum_{s=1}^{K_2} (x_{(r,s)k} \Phi_{(r,s)}) \right) \Big/ \sum_{r=1}^{K_1} \sum_{s=1}^{K_2} \Phi_{(r,s)}, \quad (1)$$

for $k = 1, 2, 3$ where $\Phi_{(r,s)}=1$ only if all components of the input color pixel $x_{(r,s)}$ are greater than or equal to the threshold η; that is, $x_{(r,s)k} \geq \eta$ for k=1, 2, 3. Otherwise, $\Phi_{(r,s)}=0$ that is, for any $x_{(r,s)k} < \eta$. If no white pixels are present in the input image X or, eventually, if the number of white-like pixels is too low or too high to get accurate values using Equation (1), the components $\bar{x}_k$ of the global vector $\bar{x}$ can be determined by averaging all pixels of the input image as follows:

$$\bar{x}_k = \frac{1}{K_1 K_2} \sum_{r=1}^{K_1} \sum_{s=1}^{K_2} x_{(r,s)k}, \quad (2)$$

for $k = 1, 2, 3$

Note that Equation (1) reduces to Equation (2) when $\Phi_{(r,s)}=1$ for r=1, 2, ..., $K_1$ and s=1, 2, ..., $K_2$. After the global vector $\bar{x}$ has been formed, it can be used to determine global gain values; for example, as $\bar{x}_2/\bar{x}_1$ and $\bar{x}_2/\bar{x}_3$ which can be used, respectively, to adjust the R and B (chrominance) components of the pixels of the input image.

At 106, local gain values are determined for the R and B components of each individual pixel of the input image. For instance, following the above definition of the global gain values, local gain values can be expressed as $x_{(r,s)2}/x_{(r,s)1}$ for the R components and $x_{(r,s)2}/x_{(r,s)3}$ for the B components. At 108, a final gain value is determined for the R and B components of each individual pixel of the input image based on contributions of the local and global gain values. Then, at 110, a white-balanced output image is produced by adjusting the R and B components of each pixel in the input image using the corresponding final gain value.

The acts 106, 108, and 110 can be implemented according to the following example equations:

$$y_{(r,s)1} = f(x_{(r,s)1}, \lambda g(x_{(r,s)2}, x_{(r,s)1}) + (1-\lambda) g(\bar{x}_2, \bar{x}_1)) \quad (3)$$

$$y_{(r,s)2} = x_{(r,s)2} \quad (4)$$

$$y_{(r,s)3} = f(x_{(r,s)3}, \lambda g(x_{(r,s)2}, x_{(r,s)3}) + (1-\lambda) g(\bar{x}_3, \bar{x}_1)) \quad (5)$$

where f(•) denotes an adjustment operation and g(•) denotes a gain formulation. A parameter λ is used to control the contribution of the local white balancing gains $g(x_{(r,s)2}, x_{(r,s)1})$ and $g(x_{(r,s)2}, x_{(r,s)3})$ whereas its complementary value 1−λ controls the contribution of the global white balancing gains $g(\bar{x}_2, \bar{x}_1)$ and $g(\bar{x}_2, \bar{x}_3)$. Thus, the λ parameter determines the appearance of color in the output, white-balanced image using both local and global image characteristics. For example, λ values close to zero provide grayish-like coloration due to the preference of the global image characteristics. On the other hand, higher negative λ values usually lead to warm or even saturated colors, whereas higher positive λ values usually allow for cold colors. The λ parameter can be predetermined, in a digital camera for example, or can be manually set by the user to obtain the desired results when processing digital photographs or other digital images, on a personal computer for example. More sophisticated solutions can use λ determined adaptively using image statistics at the expense of increased computational complexity. The white-balanced image Y may be obtained from the input image X by performing Equations (3) to (5) for $r=1, 2, \ldots, K_1$ and $s=1, 2, \ldots, K_2$.

One example implementation of Equations (3) to (5) is embodied in the following example equations:

$$y_{(r,s)1} = x_{(r,s)1}\left(\lambda \frac{x_{(r,s)2}}{x_{(r,s)1}} + (1-\lambda)\frac{\bar{x}_2}{\bar{x}_1}\right) \quad (6)$$

$$y_{(r,s)2} = x_{(r,s)2} \quad (7)$$

$$y_{(r,s)3} = x_{(r,s)3}\left(\lambda \frac{x_{(r,s)2}}{x_{(r,s)3}} + (1-\lambda)\frac{\bar{x}_2}{\bar{x}_3}\right) \quad (8)$$

which use the above-defined local and global gains.

It should be understood that both $f(\cdot)$ and $g(\cdot)$ in Equations (3) and (5) can have numerous forms. For example, in one possible implementation, $f(\cdot)$ can addition its two arguments whereas $g(\cdot)$ can subtract its two arguments. Thus, the form of functions $f(\cdot)$ and $g(\cdot)$ should not be limited to the example formulations used in Equations (6) and (8). Additional details regarding the functions $f(\cdot)$ and $g(\cdot)$ will be given below in connection with a second example embodiment of the method 100.

II. Second Example Embodiment

A second example embodiment of the method 100 will now be disclosed in connection with FIG. 1. In the second example embodiment, both the local and global spectral characteristics of the input image are combined in more sophisticated ways compared to the first example embodiment in order to obtain the final gains in each pixel location. Using the final gains, the second example method can better mimic the appearance of color in the captured scene compared to using global gains only.

At 104, a global color vector $\bar{x}=[\bar{x}_1,\bar{x}_2,\bar{x}_3]^T$ with the components $\bar{x}_k$ is defined as follows:

$$\bar{x}_k = \frac{1}{|\zeta|}\sum_{(r,s)\in\zeta} x_{(r,s)k}, \quad (9)$$

for $$k = 1, 2, 3$$

where $|\zeta|$ denotes the number of pixels inside $\zeta$, which corresponds to a set of pixels' locations with pixels selected according to one or more predetermined criteria (such as white, gray, or even all pixels of the input image, for example) to determine the global reference vector $\bar{x}=[\bar{x}_1,\bar{x}_2,\bar{x}_3]^T$. Using $\bar{x}=[\bar{x}_1,\bar{x}_2,\bar{x}_3]^T$, global gain values for the R and B components of the input image can be expressed as $\bar{x}_2/\bar{x}_1$ and $\bar{x}_2/\bar{x}_3$, respectively.

Regardless of the criteria used to determine the components $\bar{x}_k$ (for $k=1, 2, 3$) of the global color vector $\bar{x}=[\bar{x}_1,\bar{x}_2,\bar{x}_3]^T$, the second example embodiment of the method 100 may produce pixels $y_{(r,s)}$ in the enhanced image Y as follows:

$$y_{(r,s)} = f(\alpha_{(r,s)}, x_{(r,s)}) \quad (10)$$

where $f(\cdot)$ is the function of the actual color vector $x_{(r,s)}$ and a 3×3 diagonal gain matrix $$\alpha_{(r,s)} = \begin{bmatrix} \alpha_{(r,s)1} & 0 & 0 \\ 0 & \alpha_{(r,s)2} & 0 \\ 0 & 0 & \alpha_{(r,s)3} \end{bmatrix} \quad (11)$$

updated in each pixel location. The terms $\alpha_{(r,s)1}$, $\alpha_{(r,s)2}$, and $\alpha_{(r,s)3}$ are the gains for the R, G, and B channels of the input image X. Similar to the first example embodiment of the method 100, the second example embodiment of the method 100 keeps the luminance (i.e., green) channel unchanged and alters only the chrominance (i.e., red and blue) channels of X; that is, $\alpha_{(r,s)2}=1$. The second example embodiment of the method 100 adjusts the R and B components using the final chrominance gains $\alpha_{(r,s)1}(x_{(r,s)},\bar{x})$ and $\alpha_{(r,s)3}(x_{(r,s)},\bar{x})$ which can be expressed as the function of the local (actual) color vector $x_{(r,s)}$ and the global reference color vector $\bar{x}$ with components obtained in Equation (9).

Functions $f(\cdot)$, $\alpha_{(r,s)1}(\cdot)$, and $\alpha_{(r,s)3}(\cdot)$ can have various forms. The actual form of these functions dictates the design and performance characteristics of the white-balancing process in Equation (10). For example, $\alpha_{(r,s)1}(x_{(r,s)},\bar{x})$ and $\alpha_{(r,s)3}(x_{(r,s)},\bar{x})$ can be equivalently rewritten as $\alpha_{(r,s)1}(\hat{x}_{(r,s)})$ and $\alpha_{(r,s)3}(\hat{x}_{(r,s)})$ where $\hat{x}_{(r,s)}=[\hat{x}_{(r,s)1},\hat{x}_{(r,s)2},\hat{x}_{(r,s)3}]^T$ is the final reference vector which combines the local and global spectral characteristics of the input image X. The reference vector $\hat{x}_{(r,s)}$ can be used to obtain the final gain values as follows:

$$\alpha_{(r,s)1} = \frac{\hat{x}_{(r,s)2}}{\hat{x}_{(r,s)1}}; \quad (12)$$

$$\alpha_{(r,s)3} = \frac{\hat{x}_{(r,s)2}}{\hat{x}_{(r,s)3}}$$

where $\hat{x}_{(r,s)1}=x_{(r,s)2}\bar{x}_1/\bar{x}_2$ and $\hat{x}_{(r,s)2}=x_{(r,s)1}\bar{x}_2/\bar{x}_1$ for $\alpha_{(r,s)1}$, and $\hat{x}_{(r,s)3}=x_{(r,s)2}\bar{x}_3/\bar{x}_2$ and $\hat{x}_{(r,s)2}=x_{(r,s)3}\bar{x}_2/\bar{x}_3$ for $\alpha_{(r,s)3}$, are modeled by adjusting the ratio of global color components with the corresponding local color component. Substituting the above expressions in Equation (12) gives:

$$\alpha_{(r,s)1} = \frac{\hat{x}_{(r,s)1}\bar{x}_2^2}{\hat{x}_{(r,s)2}\bar{x}_1^2}; \quad (13)$$

$$\alpha_{(r,s)3} = \frac{\hat{x}_{(r,s)3}\bar{x}_2^2}{\hat{x}_{(r,s)2}\bar{x}_3^2}$$

Note that to avoid dividing by zero, one or another low constant may be added to $x_{(r,s)2}$ in the above formulas if $x_{(r,s)2}=0$. Using the gains obtained in Equation (13), the white balancing process can be rewritten as $$y_{(r,s)} = \alpha_{(r,s)} x_{(r,s)} \quad (14)$$

where the enhanced color vector $y_{(r,s)}$ is obtained via matrix multiplication of a gain matrix $\alpha_{(r,s)}$ and a column vector $x_{(r,s)}$ representing the input pixel under consideration.

The solution in Equation (14) with Equation (13) produces good results in most situations. However, detailed inspection of Equation (13) reveals that the employed color ratio expressions can fail in one case. Namely, if $x_{(r,s)1}$ and $x_{(r,s)2}$ (or $x_{(r,s)3}$ and $x_{(r,s)2}$) represents extremes in a given bit representation, then the value of the corresponding gain coefficient $\alpha_{(r,s)1}$ (or $\alpha_{(r,s)3}$) may be excessively high or excessively low and Equation (14) can produce images with the saturated colors. To overcome this potential for saturation, Equation (12) can be redefined as follows:

$$\alpha_{(r,s)1} = \frac{\hat{x}_{(r,s)2} + \gamma}{\hat{x}_{(r,s)1} + \gamma};$$

$$\alpha_{(r,s)3} = \frac{\hat{x}_{(r,s)2} + \gamma}{\hat{x}_{(r,s)3} + \gamma}$$

(15)

resulting in the following modification of Equation (13):

$$\alpha_{(r,s)1} = \frac{x_{(r,s)1}\bar{x}_2^2 + \gamma}{x_{(r,s)2}\bar{x}_1^2 + \gamma};$$

$$\alpha_{(r,s)3} = \frac{x_{(r,s)3}\bar{x}_2^2 + \gamma}{x_{(r,s)2}\bar{x}_3^2 + \gamma}$$

(16)

where $\gamma$ is a positive-valued parameter used to control the white balancing process. Excessively low $\gamma$ values can lead to saturation effects whereas using excessively high $\gamma$ values can reduce the level of color enhancement from a visually pleasing warm appearance to the original unbalanced coloration.

Shifting linearly the components of the reference vector, as seen in Equation (15), may change significantly the gain values compared to the gain expressions in Equation (12). To reduce the influence of this effect on the output values, Equation (14) may be redefined as follows:

$$y_{(r,s)} = -\gamma + \alpha_{(r,s)}(x_{(r,s)} + \gamma)$$

(17)

where $\gamma = [\gamma,\gamma,\gamma]^T$ is a vector constant with identical positive elements.

The expression in Equation (17) uses gains in the form of normalized color ratios. Since the components of the reference vector $\hat{x}_{(r,s)}$ are obtained using conventional color ratios, they can be redefined using the normalized color ratios as $\hat{x}_{(r,s)1} = -\gamma + (x_{(r,s)2}+\gamma)(\bar{x}_1+\gamma)/(\bar{x}_2+\gamma)$ and $\hat{x}_{(r,s)2} = -\gamma + (x_{(r,s)1}+\gamma)(\bar{x}_2+\gamma)/(\bar{x}_1+\gamma)$ for $\alpha_{(r,s)1}$, and $\hat{x}_{(r,s)3} = -\gamma + (x_{(r,s)2}+\gamma)(\bar{x}_3+\gamma)/(\bar{x}_2+\gamma)$ and $\hat{x}_{(r,s)2} = -\gamma + (x_{(r,s)3}+\gamma)(\bar{x}_2+\gamma)/(\bar{x}_3+\gamma)$ for $\alpha_{(r,s)3}$. This modification provides the following gain expressions:

$$\alpha_{(r,s)1} = \frac{(x_{(r,s)1} + \gamma)(\bar{x}_2 + \gamma)^2}{(x_{(r,s)2} + \gamma)(\bar{x}_1 + \gamma)^2};$$

$$\alpha_{(r,s)3} = \frac{(x_{(r,s)3} + \gamma)(\bar{x}_2 + \gamma)^2}{(x_{(r,s)2} + \gamma)(\bar{x}_3 + \gamma)^2}$$

(18)

which can be used in conjunction with Equation (17). Usually, using modest $\gamma$ values prevents both saturation and suppressed coloration effects.

The determination of the reference vector $\hat{x}_{(r,s)}$ using ratio-like calculations is not the only way to calculate the final gains. Similar to adjusting the ratio of global color components with the corresponding local color component, the components of $\hat{x}_{(r,s)}$ can be obtained by adjusting the difference of global color components with the corresponding local color component as $\hat{x}_{(r,s)1} = x_{(r,s)2} + \bar{x}_1 - \bar{x}_2$ and $\hat{x}_{(r,s)2} = x_{(r,s)1} + \bar{x}_2 - \bar{x}_1$ for $\alpha_{(r,s)1}$, and $\hat{x}_{(r,s)3} = x_{(r,s)2} + \bar{x}_3 - \bar{x}_2$ and $\hat{x}_{(r,s)2} = x_{(r,s)3} + \bar{x}_2 - \bar{x}_3$ for $\alpha_{(r,s)3}$. Such a reference vector can be used to calculate the gains via Equation (12) or Equation (15). In addition, the same vector can be used to calculate the gains as follows:

$$\alpha_{(r,s)1} = \hat{x}_{(r,s)2} - \hat{x}_{(r,s)1}; \quad \alpha_{(r,s)3} = \hat{x}_{(r,s)2} - \hat{x}_{(r,s)3}$$

(19)

resulting in the equivalent gain expressions:

$$\alpha_{(r,s)1} = x_{(r,s)1} - x_{(r,s)2} + 2\bar{x}_2 - 2\bar{x}_1; \quad \alpha_{(r,s)3} = x_{(r,s)3} - x_{(r,s)2} + 2\bar{x}_2 - 2\bar{x}_3$$

(20)

Rewriting the diagonal gain matrix to a vector $\alpha_{(r,s)} = [\alpha_{(r,s)1}, \alpha_{(r,s)2}, \alpha_{(r,s)3}]^T$, with $\alpha_{(r,s)2}=0$ if the luminance channel should be kept unchanged, allows redefining the white balancing process in Equation (14) and Equation (17) as follows:

$$y_{(r,s)} = \alpha_{(r,s)} + x_{(r,s)}$$

(21)

Similar to Equation (14) with Equation (12), the above formula does not use a parameter to control performance. The enhanced color vector $y_{(r,s)}$ is obtained via Equation (21) with Equation (20), or more generally, via Equation (21) with Equation (19).

In order for the white balancing process to be controlled by a user through a positive parameter $\gamma$, Equation (21) may be redefined as follows:

$$y_{(r,s)} = \gamma \alpha_{(r,s)} + x_{(r,s)}$$

(22)

where $\gamma > 1$ emphasizes color enhancement of the input image whereas $\gamma < 1$ suppresses the white balancing effects achieved in Equation (21).

The acts 106, 108, and 110 can be implemented using Equation (14), Equation (17), Equation (21), or Equation (22) for $r=1, 2, \ldots, K_1$ and $s=1, 2, \ldots, K_2$. Since the gains are calculated in each pixel location, the white balancing process can be performed more accurately compared to the solutions solely operating using global gain values $\bar{x}_2/\bar{x}_1$ and $\bar{x}_2/\bar{x}_3$ obtained in Equation (9). The second example embodiment of the method 100 can produce visually pleasing images, especially in scenarios with varying color characteristics.

Depending on the key construction elements, such as the approach used to determine the reference vector $\hat{x}_{(r,s)}$, the formulas by which the final gains $\alpha_{(r,s)1}$ and $\alpha_{(r,s)3}$ are obtained, and the white balancing formula used to produce the enhanced color output $y_{(r,s)}$; the second example embodiment of the method 100 can offer solutions which differ in the design philosophy, characteristics, computational complexity, and performance. For example, Equation (14) with color-ratio calculations in Equation (13) or Equation (16) dictate that the white balancing process is performed using the chrominance information, whereas color-difference calculations in Equation (21) with Equation (20) or Equation (22) with Equation (20) suggest the use of the luminance information during processing. Since both luminance and chrominance are important for the human perception, Equation (17) with Equation (18) may allow additional performance improvements, as such a solution combines the color vectors' magnitude and direction and these correspond to the luminance and chrominance components of color.

The second example embodiment of the method 100 yields great freedom in designing white balancing solutions. In addition to the example previously discussed, the second example embodiment of the method 100 can combine the concepts behind the formulas used to combine the global and local image characteristics and perform the actual white balancing operations. For example, the reference vector $\hat{x}_{(r,s)}$ calculated using the standard or normalized color ratios can be used in the white balancing formulas listed in Equation (19), Equation (21), and Equation (22) whereas $\hat{x}_{(r,s)}$ calculated using the color differences can be used in Equation (12), Equation (14), Equation (15), and Equation (17).

Using the reference vector $\hat{x}_{(r,s)}=[\hat{x}_{(r,s)1},\hat{x}_{(r,s)2},\hat{x}_{(r,s)3}]^T$ as described above is not the only way to produce the white-balanced output. By replacing the actual color pixel $x_{(r,s)}$ with the reference vector $\hat{x}_{(r,s)}$ in the local gain calculations used in Equations (3) and (5), the acts 106, 108, and 110 can also be implemented according to the following example equations:

$$y_{(r,s)1}=f(x_{(r,s)1},\lambda g(\hat{x}_{(r,s)2},\hat{x}_{(r,s)1})+(1-\lambda)g(\bar{x}_2,\bar{x}_1)) \quad (23)$$

$$y_{(r,s)2}=x_{(r,s)2} \quad (24)$$

$$y_{(r,s)3}=f(x_{(r,s)3},\lambda g(\hat{x}_{(r,s)2},\hat{x}_{(r,s)3})+(1-\lambda)g(\bar{x}_2,\bar{x}_3)) \quad (25)$$

where $f(\cdot)$ denotes an adjustment operation and $g(\cdot)$ denotes a gain formulation. The white-balanced image Y may be obtained from the input image X by performing Equations (23) to (25) for $r=1, 2, \ldots, K_1$ and $s=1, 2, \ldots, K_2$.

III. Third Example Embodiment

A third example embodiment of the method 100 will now be disclosed in connection with FIG. 1. The third example embodiment of the method 100 operates directly on color filter array (CFA) sensor data before the CFA sensor data has been demosaicked into a full-color image. The CFA sensor data constitutes a gray-scale mosaic-like image z with pixels $z_{(r,s)}$. Each pixel location corresponds to the red (R), green (G), or blue (B) color filter in the CFA. The arrangement of color filters in the CFA varies among the camera manufacturers. One example arrangement is the Bayer pattern with GRGR phase in odd rows and BGBG phase in even rows. In this CFA with $K_1$ rows and $K_2$ columns where $r=1, 2, \ldots, K_1$ and $s=1, 2, \ldots, K_2$ denote, respectively, the image row and column, $z_{(r,s)}$ corresponds to the R components for (odd r, even s), the G components for (odd r, odd s) and (even r, even s), and the B components for (even r, odd s). Note that the G components constitute the luminance signal, whereas the R and B components constitute the chrominance signal. Although the following description of the third example embodiment is disclosed in connection with the Bayer CFA presented above, the extension of the third example embodiment to other CFA arrangements is straightforward and contemplated.

For example, using color-ratio calculations, locally-adaptive white balancing of Bayer CFA data can generally be performed as follows:

$$z_{(r,s)} = \begin{cases} z_{(r,s)}[\lambda\alpha_L(z)+(1-\lambda)\alpha_G(z)] & \text{for (odd } r, \text{ even } s) \text{ and (even } r, \text{ odd } s) \\ z_{(r,s)} & \text{otherwise} \end{cases} \quad (26)$$

where $\alpha_G(z)$ denotes a global gain, $\alpha_L(z)$ denotes a local gain, and $\lambda$ is an adjustable parameter. Similarly to the previous example embodiments, the white-balancing process in Equation (26) adjusts only chrominance (i.e., red and blue) components of the input image.

The global spectral term $\alpha_G(Z)$ can be expressed as follows:

$$\alpha_G(z) = \begin{cases} \overline{G}/\overline{R} & \text{for (odd } r, \text{ even } s) \\ \overline{G}/\overline{B} & \text{for (even } r, \text{ odd } s) \end{cases} \quad (27)$$

where $\overline{G}$ is the mean of $z_{(r,s)}$ entries located in (odd r, odd s) and (even r, even s), whereas $\overline{R}$ and $\overline{B}$ denote, respectively, the mean of $z_{(r,s)}$ entries located in (odd r, even s) and (even r, odd s). The relation between the $\overline{R}$, $\overline{G}$, and $\overline{B}$ values is used to express the global spectral characteristics of the CFA image z. It should be understood that $\overline{R}$, $\overline{G}$, and $\overline{B}$ can be obtained in a number of ways, for example, by using the pixels selected according to one or more predetermined criteria similar to those used in Equation (1).

To obtain the local gain value in the same scale as the global gains from Equation (27), the local spectral characteristics of z should be expressed in color-ratio form. Therefore, the local spectral term $\alpha_L(z)$ corresponding to $\alpha_L(z)$ obtained via Equation (27) should be defined as follows:

$$\alpha_L(z)=z_{(r,s)}{}^L/z_{(r,s)} \text{ for (odd r, even s) and (even r, odd s)} \quad (28)$$

where $z_{(r,s)}{}^L$ is a local G component. Since each pixel location of the CFA image z contains only one $z_{(r,s)}$ reading which corresponds to the R component for (odd r, even s) or the B component for (even r, odd s), the local $z_{(r,s)}{}^L$ can be estimated from the available G CFA entries. To minimize processing errors, $z_{(r,s)}{}^L$ can be expressed as the function of the spatially closest CFA luminance samples. For Bayer CFA data, in the simplest form $z_{(r,s)}{}^L$ can be obtained as average of four G components surrounding the CFA chrominance location under consideration (r,s) in the vertical and horizontal directions as follows:

$$z_{(r,s)}{}^L=(z_{(r-1,s)}+z_{(r,s+1)}+z_{(r,s+1)}+z_{(r+1,s)})/4 \quad (29)$$

For natural images, CFA data is highly correlated in both the spatial and the spectral sense. Therefore, higher precision of the operation in Equation (28) can be obtained if $z_{(r,s)}{}^L$ is estimated using both the luminance and chrominance samples. Thus, $z_{(r,s)}{}^L$ should be defined as $z_{(r,s)}{}^L=\rho(z_{(i,j)}; (i,j)\in\theta)$ with $\rho(\cdot)$ denoting the function of the local neighborhood $\theta$ centered in (r,s); for example, $\theta=\{(r+a,s+b); -1\leq a\leq 1, -1\leq b\leq 1\}$ for a 3×3 window.

Substituting the expressions from Equation (27) and Equation (28) to Equation (26) gives the formula of the pixel-adaptive or locally-adaptive white balancing method for CFA images:

$$z_{(r,s)} = \begin{cases} \lambda z_{(r,s)}^L + (1-\lambda)z_{(r,s)}\overline{G}/\overline{R} & \text{for (odd } r, \text{ even } s) \\ \lambda z_{(r,s)}^L + (1-\lambda)z_{(r,s)}\overline{G}/\overline{B} & \text{for (even } r, \text{ odd } s) \\ z_{(r,s)} & \text{otherwise} \end{cases} \quad (30)$$

The application of the proposed method to other types of non-Bayer CFA images is contemplated. Applying Equation (30) in all pixel locations of z produces a white-balanced CFA image. A full-color white-balanced image is obtained directly by demosaicking the output of Equation (30), without the need to perform computationally expensive white balancing on demosaicked full-color data. Depending on $\lambda$, the coloration of the demosaicked white-balanced image can vary significantly. Similar to the first example embodiment, $\lambda>1$ results in images with cold colors, $\lambda=1$ provides a gray-scale luminance image, $\lambda=0$ results in a color image with grayish or washed-out colors, $0>\lambda\geq-1$ allows highly quality, visually pleasing color images to be achieved, and $\lambda<-1$ produces images with warm to saturated colors.

It should be understood that $\alpha_G(z)$ and $\alpha_L(z)$ can have forms other than the color-ratio versions disclosed in Equations (27) and (28), providing a number of white balancing solutions which differ in their performance and computational complexity. For example, one could replace color-ratio versions of $\alpha_G(z)$ and $\alpha_L(z)$ with other solutions disclosed herein in connection with white-balancing of full-color data (for example, as disclosed in connection with the second example embodiment). Thus, following the familiar white-balancing formulas from the first two example embodiments, the white balancing formula from Equation (30) can be redefined as follows:

$$z_{(r,s)} = \begin{cases} f(z_{(r,s)}, \lambda g(z_{(r,s)}^L, z_{(r,s)}) + (1-\lambda)g(\overline{G}/\overline{R})) & \text{for (odd } r, \text{even } s) \\ f(z_{(r,s)}, \lambda g(z_{(r,s)}^L, z_{(r,s)}) + (1-\lambda)g(\overline{G}/\overline{B})) & \text{for (even } r, \text{odd } s) \\ z_{(r,s)} & \text{otherwise} \end{cases} \quad (31)$$

The example embodiments disclosed herein may be embodied in other specific forms. The example embodiments disclosed herein are to be considered in all respects only as illustrative and not restrictive.

What is claimed is:

1. A method for automatic white balancing of a full-color input image, the method comprising the acts of using a processor to:

select pixels of the input image according to one or more predetermined criteria;

determine global gain values for R and B components of the input image using the selected pixels;

determine local gain values for the R and B components of each individual pixel of the input image based on characteristics of each individual pixel;

determine a final gain value for the R and B components of each individual pixel of the input image based on contributions of the local and global gain values; and produce a white-balanced output image by adjusting the R and B components of each pixel in the input image using the corresponding final gain value; and wherein producing a white-balanced output image by adjusting the R and B components of each pixel in the input image using the corresponding final gain value comprises producing a white-balanced output image Y made up of pixels $y_{(r,s)}=[y_{(r,s)1},y_{(r,s)2},y_{(r,s)3}]^T$ according to the following equations:

$y_{(r,s)1}=f(x_{(r,s)1},\lambda g(x_{(r,s)2},x_{(r,s)1})+(1-\lambda)g(\overline{x}_2,\overline{x}_1))$;

$y_{(r,s)2}=x_{(r,s)2}$; and $y_{(r,s)3}=f(x_{(r,s)3},\lambda g(x_{(r,s)2},x_{(r,s)3})+(1-\lambda)g(\overline{x}_3,\overline{x}_1))$;

where:

$f(\cdot)$ denotes an adjustment operation and $g(\cdot)$ denotes a gain formulation:

$$\overline{x}_k = \left(\sum_{r=1}^{K_1}\sum_{s=1}^{K_2}(x_{(r,s)k}\Phi_{(r,s)})\right) / \sum_{r=1}^{K_1}\sum_{s=1}^{K_2}\Phi_{(r,s)}$$

or $$\overline{x}_k = \frac{1}{K_1 K_2}\sum_{r=1}^{K_1}\sum_{s=1}^{K_2}x_{(r,s)k}, \text{ for } k=1,2,3;$$

$x_{(r,s)}=[x_{(r,s)1},x_{(r,s)2},x_{(r,s)3}]^T$ with components $x_{(r,s)k}$ is a pixel of the input image X;

$\overline{x}=[\overline{x}_1,\overline{x}_2,\overline{x}_3]^T$ with components $\overline{x}_k$ is the global reference vector;

$K_1$ is the number of rows in the input image X;

$K_2$ is the number of columns in the input image X;

$r=1,2,\ldots,K_1$ and $s=1,2,\ldots,K_2$;

$k=1,2,3$ correspond to the R, G, and B components of a pixel, respectively;

$\eta$ is the threshold;

$\Phi_{(r,s)}=1$ if all $x_{(r,s)k}\geq\eta$ for $k=1,2,3$; and $\Phi_{(r,s)}=0$ if any $x_{(r,s)k}<\eta$ for $k=1,2,3$.

2. The method as recited in claim 1, wherein determining global gain values for the R and B components of the input image comprises determining global gain values for the R and B components of the input image X according to the following equations, respectively:

$$\frac{\overline{x}_2}{\overline{x}_1},$$

and $$\frac{\overline{x}_2}{\overline{x}_3}.$$

3. The method as recited in claim 2, wherein determining local gain values for the R and B components of each individual pixel of the input image X based on characteristics of each individual pixel comprises determining local gain values for the R and B components of each individual pixel of the input image X according to the following equations, respectively:

$$\frac{x_{(r,s)2}}{x_{(r,s)1}}, \text{ and}$$

$$\frac{x_{(r,s)2}}{x_{(r,s)3}}.$$

4. The method as recited in claim 3, wherein determining a final gain value for the R and B components of each individual pixel of the input image based on contributions of the local and global gain values comprises determining a final gain value for the R and B components of each individual pixel $x_{(r,s)}$ of the input image X according to the following equations, respectively:

$$\lambda\frac{x_{(r,s)2}}{x_{(r,s)1}} + (1-\lambda)\frac{\overline{x}_2}{\overline{x}_1}, \text{ and}$$

$$\lambda\frac{x_{(r,s)2}}{x_{(r,s)3}} + (1-\lambda)\frac{\overline{x}_2}{\overline{x}_3},$$

where:

$\lambda$ is a parameter used to control the contribution of the local white balancing gains; and $1-\lambda$ is a parameter used to control the contribution of the global white balancing gains.

5. The method as recited in claim 4, wherein producing a white-balanced output image by adjusting the R and B components of each pixel in the input image with the corresponding final gain value comprises producing a white-balanced output image Y made up of pixels $y_{(r,s)}=[y_{(r,s)1}, y_{(r,s)2}, y_{(r,s)3}]^T$ according to the following equations:

$$y_{(r,s)1} = x_{(r,s)1}\left(\lambda \frac{x_{(r,s)2}}{x_{(r,s)1}} + (1-\lambda)\frac{\bar{x}_2}{\bar{x}_1}\right),$$

$$y_{(r,s)2} = x_{(r,s)2}, \text{ and}$$

$$y_{(r,s)3} = x_{(r,s)3}\left(\lambda \frac{x_{(r,s)2}}{x_{(r,s)3}} + (1-\lambda)\frac{\bar{x}_2}{\bar{x}_3}\right).$$

6. A method for automatic white balancing of a full-color input image, the method comprising the acts of using a processor to:
   select pixels of the input image according to one or more predetermined criteria;
   determine a global reference color vector of the input image using the selected pixels;
   determine a final gain value for the R and B components of each individual pixel of the input image by combining both the global reference color vector and a local color vector corresponding to the individual pixel; and
   produce a white-balanced output image by adjusting the R and B components of each pixel in the input image using the corresponding final gain value; and
   wherein producing a white-balanced output image by adjusting the R and B components of each pixel in the input image using the corresponding final gain value comprises producing a white-balanced output image made up of pixels $y_{(r,s)}=[y_{(r,s)1}, y_{(r,s)2}, y_{(r,s)3}]^T$ according to the following equations:

$$y_{(r,s)1}=f(x_{(r,s)1},\lambda g(\hat{x}_{(r,s)2},\hat{x}_{(r,s)1})+(1-\lambda)g(\bar{x}_2,\bar{x}_1)),$$

$$y_{(r,s)2}=x_{(r,s)2}, \text{ and}$$

$$y_{(r,s)3}=f(x_{(r,s)3},\lambda g(\hat{x}_{(r,s)2},\hat{x}_{(r,s)3})+(1-\lambda)g(\bar{x}_2,\bar{x}_3)),$$

where:
   $f(\bullet)$ denotes an adjustment operation and $g(\bullet)$ denotes a gain formulation;
   $x_{(r,s)}=[x_{(r,s)1},x_{(r,s)2},x_{(r,s)3}]^T$ with components $x_{(r,s)k}$ is a pixel of the input image X;
   $\bar{x}=[\bar{x}_1, \bar{x}_2, \bar{x}_3]^T$ with components $\bar{x}_k$ is the global reference vector $$\bar{x}_k = \frac{1}{|\zeta|}\sum_{(r,s)\in\zeta} x_{(i,j)k}, \text{ for } k=1, 2, 3;$$

$\hat{x}_{(r,s)}=[\hat{x}_{(r,s)1},\hat{x}_{(r,s)2},\hat{x}_{(r,s)3}]^T$ with components $\hat{x}_{(r,s)k}$ is a reference color vector which combines properties of $\bar{x}$ and $x_{(r,s)}$;
   $K_1$ is the number of rows in the input image X;
   $K_2$ is the number of columns in the input image X;
   $r=1, 2, \ldots, K_1$ and $s=1, 2, \ldots, K_2$;
   $k=1, 2, 3$ correspond to the R, G, and B components of a pixel, respectively; and
   $\zeta$ corresponds to a set of pixels selected according to one or more predefined criteria, with $|\zeta|$ denoting the number of pixels inside $\zeta$.

7. The method as recited in claim 6, further comprising obtaining an updated reference color vector $\hat{x}_{(r,s)}=[\hat{x}_{(r,s)1},$ $\hat{x}_{(r,s)2},\hat{x}_{(r,s)3}]^T$ for adjusting the R and B components of each pixel in the input image using the corresponding final gain value by combining the global reference color vector $\bar{x}=[\bar{x}_1, \bar{x}_2, \bar{x}_3]^T$ and the input pixel $x_{(r,s)}=[x_{(r,s)1},x_{(r,s)2},x_{(r,s)3}]^T$ in locations under consideration according to one of the following sets of four equations:

$$\hat{x}_{(r,s)1}=x_{(r,s)2}\bar{x}_1/\bar{x}_2 \text{ and}$$

$$\hat{x}_{(r,s)2}=x_{(r,s)1}\bar{x}_2/\bar{x}_1 \text{ for } y_{(r,s)1}, \text{ and}$$

$$\hat{x}_{(r,s)3}=x_{(r,s)2}\bar{x}_3/\bar{x}_2 \text{ and}$$

$$\hat{x}_{(r,s)2}=x_{(r,s)3}\bar{x}_2/\bar{x}_3 \text{ for } y_{(r,s)3}; \text{ or}$$

$$\hat{x}_{(r,s)1}=-\gamma+(x_{(r,s)2}+\gamma)(\bar{x}_1+\gamma)/(\bar{x}_2+\gamma) \text{ and}$$

$$\hat{x}_{(r,s)2}=-\gamma+(x_{(r,s)1}+\gamma)(\bar{x}_2+\gamma)/(\bar{x}_1+\gamma) \text{ for } y_{(r,s)1}, \text{ and}$$

$$\hat{x}_{(r,s)3}=-\gamma+(x_{(r,s)2}+\gamma)(\bar{x}_3+\gamma)/(\bar{x}_2+\gamma) \text{ and}$$

$$\hat{x}_{(r,s)2}=-\gamma+(x_{(r,s)3}+\gamma)(\bar{x}_2+\gamma)/(\bar{x}_3+\gamma) \text{ for } y_{(r,s)3}; \text{ or}$$

$$\hat{x}_{(r,s)1}=x_{(r,s)2}+\bar{x}_1-\bar{x}_2 \text{ and}$$

$$\hat{x}_{(r,s)2}=x_{(r,s)1}+\bar{x}_2-\bar{x}_1 \text{ for } y_{(r,s)1}, \text{ and}$$

$$\hat{x}_{(r,s)3}=x_{(r,s)2}+\bar{x}_3-\bar{x}_2 \text{ and}$$

$$\hat{x}_{(r,s)2}=x_{(r,s)3}+\bar{x}_2-\bar{x}_3 \text{ for } y_{(r,s)3}.$$

8. The method as recited in claim 6, wherein producing a white-balanced output image by adjusting the R and B components of each pixel in the input image using the corresponding final gain value comprises producing a white-balanced output image made up of pixels $y_{(r,s)}=[y_{(r,s)1}, y_{(r,s)2}, y_{(r,s)3}]^T$ according to the following equations:

$$y_{(r,s)1}=f(x_{(r,s)1},\alpha_{(r,s)1}),$$

$$y_{(r,s)2}=x_{(r,s)2}, \text{ and}$$

$$y_{(r,s)3}=f(x_{(r,s)3},\alpha_{(r,s)3}),$$

where:
   $f(\bullet)$ denotes an adjustment operation
   $\alpha_{(r,s)1}$ and $\alpha_{(r,s)3}$ denote gain terms expressed as the functions of $\hat{x}_{(r,s)}=[\hat{x}_{(r,s)1},\hat{x}_{(r,s)2},\hat{x}_{(r,s)3}]^T$;
   $x_{(r,s)}=[x_{(r,s)1},x_{(r,s)2},x_{(r,s)3}]^T$ with components $x_{(r,s)k}$ is a pixel of the input image X;
   $\bar{x}=[\bar{x}_1, \bar{x}_2, \bar{x}_3]^T$ with components $\bar{x}_k$ is the global reference vector;

$$\bar{x}_k = \frac{1}{|\zeta|}\sum_{(r,s)\in\zeta} x_{(i,j)k}, \text{ for } k=1, 2, 3;$$

$\hat{x}_{(r,s)}=[\hat{x}_{(r,s)1},\hat{x}_{(r,s)2},\hat{x}_{(r,s)3}]^T$ with components $\hat{x}_{(r,s)k}$ is a reference color vector which combines properties of $\bar{x}$ and $x_{(r,s)}$;
   $K_1$ is the number of rows in the input image X;
   $K_2$ is the number of columns in the input image X;
   $r=1, 2, \ldots, K_1$ and $s=1, 2, \ldots, K_2$;
   $k=1, 2, 3$ correspond to the R, G, and B components of a pixel, respectively; and
   $\zeta$ corresponds to a set of pixels selected according to one or more predefined criteria, with $|\zeta|$ denoting the number of pixels inside $\zeta$.

9. The method as recited in claim 8, further comprising obtaining an updated reference color vector $\hat{x}_{(r,s)}=[\hat{x}_{(r,s)1},$ $\hat{x}_{(r,s)2}, \hat{x}_{(r,s)3}]^T$ for adjusting the R and B components of each pixel in the input image using the corresponding final gain value by combining the global reference color vector $\bar{x}=[\bar{x}_1, \bar{x}_2, \bar{x}_3]^T$ and the input pixel $x_{(r,s)}=[x_{(r,s)1}, x_{(r,s)2}, x_{(r,s)3}]^T$ in locations under consideration according to one of the following sets of equations:

$\hat{x}_{(r,s)1} = x_{(r,s)2}\bar{x}_1/\bar{x}_2$ and $\hat{x}_{(r,s)2} = x_{(r,s)1}\bar{x}_2/\bar{x}_1$ for $y_{(r,s)1}$, and $\hat{x}_{(r,s)3} = x_{(r,s)2}\bar{x}_3/\bar{x}_2$ and $\hat{x}_{(r,s)2} = x_{(r,s)3}\bar{x}_2/\bar{x}_3$ for $y_{(r,s)3}$; or $\hat{x}_{(r,s)1} = -\gamma + (x_{(r,s)2}+\gamma)(\bar{x}_1+\gamma)/(\bar{x}_2+\gamma)$ and $\hat{x}_{(r,s)2} = -\gamma + (x_{(r,s)1}+\gamma)(\bar{x}_2+\gamma)/(\bar{x}_1+\gamma)$ for $y_{(r,s)1}$, and $\hat{x}_{(r,s)3} = -\gamma + (x_{(r,s)2}+\gamma)(\bar{x}_3+\gamma)/(\bar{x}_2+\gamma)$ and $\hat{x}_{(r,s)2} = -\gamma + (x_{(r,s)3}+\gamma)(\bar{x}_2+\gamma)/(\bar{x}_3+\gamma)$ for $y_{(r,s)3}$; or $\hat{x}_{(r,s)1} = x_{(r,s)2} + \bar{x}_1 - \bar{x}_2$ and $\hat{x}_{(r,s)2} = x_{(r,s)1} + \bar{x}_2 - \bar{x}_1$ for $y_{(r,s)1}$, and $\hat{x}_{(r,s)3} = x_{(r,s)2} + \bar{x}_3 - \bar{x}_2$ and $\hat{x}_{(r,s)2} = x_{(r,s)3} + \bar{x}_2 - \bar{x}_3$ for $y_{(r,s)3}$.

10. The method as recited in claim 8, wherein producing a white-balanced output image by adjusting the R and B components of each pixel in the input image using the corresponding final gain value comprises producing a white-balanced output image made up of pixels $y_{(r,s)} = [y_{(r,s)1}, y_{(r,s)2}, y_{(r,s)3}]^T$ according to the following equations:

$$y_{(r,s)1} = \frac{x_{(r,s)1}\bar{x}_2^2}{x_{(r,s)2}\bar{x}_1^2} x_{(r,s)1},$$

$$y_{(r,s)2} = x_{(r,s)2}, \text{ and}$$

$$y_{(r,s)3} = \frac{x_{(r,s)3}\bar{x}_2^2}{x_{(r,s)2}\bar{x}_3^2} x_{(r,s)3}.$$

11. The method as recited in claim 8, wherein producing a white-balanced output image by adjusting the R and B components of each pixel in the input image using the corresponding final gain value comprises producing a white-balanced output image made up of pixels $y_{(r,s)} = [y_{(r,s)1}, y_{(r,s)2}, y_{(r,s)3}]^T$ according to the following equations:

$$y_{(r,s)1} = \frac{x_{(r,s)1}\bar{x}_2^2 + \gamma}{x_{(r,s)2}\bar{x}_1^2 + \gamma} x_{(r,s)1},$$

$$y_{(r,s)2} = x_{(r,s)2}, \text{ and}$$

$$y_{(r,s)3} = \frac{x_{(r,s)3}\bar{x}_2^2 + \gamma}{x_{(r,s)2}\bar{x}_3^2 + \gamma} x_{(r,s)3},$$

where $\gamma$ is a positive-valued parameter used to control the white balancing process.

12. The method as recited in claim 8, wherein producing a white-balanced output image by adjusting the R and B components of each pixel in the input image using the corresponding final gain value comprises producing a white-balanced output image made up of pixels $y_{(r,s)} = [y_{(r,s)1}, y_{(r,s)2}, y_{(r,s)3}]^T$ according to the following equations:

$$y_{(r,s)1} = -\gamma + \frac{x_{(r,s)1}\bar{x}_2^2 + \gamma}{x_{(r,s)2}\bar{x}_1^2 + \gamma}(x_{(r,s)1} + \gamma),$$

$$y_{(r,s)2} = x_{(r,s)2}, \text{ and}$$

$$y_{(r,s)3} = -\gamma + \frac{x_{(r,s)3}\bar{x}_2^2 + \gamma}{x_{(r,s)2}\bar{x}_3^2 + \gamma}(x_{(r,s)3} + \gamma),$$

where $\gamma$ is a positive-valued parameter used to control the white balancing process.

13. The method as recited in claim 8, wherein producing a white-balanced output image by adjusting the R and B components of each pixel in the input image using the corresponding final gain value comprises producing a white-balanced output image made up of pixels $y_{(r,s)} = [y_{(r,s)1}, y_{(r,s)2}, y_{(r,s)3}]^T$ according to the following equations:

$$y_{(r,s)1} = -\gamma + \frac{(x_{(r,s)1} + \gamma)(\bar{x}_2 + \gamma)^2}{(x_{(r,s)2} + \gamma)(\bar{x}_1 + \gamma)^2}(x_{(r,s)1} + \gamma),$$

$$y_{(r,s)2} = x_{(r,s)2}, \text{ and}$$

$$y_{(r,s)3} = -\gamma + \frac{(x_{(r,s)3} + \gamma)(\bar{x}_2 + \gamma)^2}{(x_{(r,s)2} + \gamma)(\bar{x}_3 + \gamma)^2}(x_{(r,s)3} + \gamma),$$

where $\gamma$ is a positive-valued parameter used to control the white balancing process.

14. The method as recited in claim 8, wherein producing a white-balanced output image by adjusting the R and B components of each pixel in the input image using the corresponding final gain value comprises producing a white-balanced output image made up of pixels $y_{(r,s)} = [y_{(r,s)1}, y_{(r,s)2}, y_{(r,s)3}]^T$ according to the following equations:

$y_{(r,s)1} = (x_{(r,s)1} - x_{(r,s)2} + 2\bar{x}_2 - 2\bar{x}_1) + x_{(r,s)1},$ $y_{(r,s)2} = x_{(r,s)2},$ and $y_{(r,s)3} = (x_{(r,s)3} - x_{(r,s)2} + 2\bar{x}_2 - 2\bar{x}_3) + x_{(r,s)3},$ where $\gamma$ is a positive-valued parameter used to control the white balancing process.

15. The method as recited in claim 8, wherein determining a final gain value for the R and B components of each individual pixel of the input image by combining both the global reference color vector and a local color vector corresponding to the individual pixel comprises determining a final gain value for the R and B components of each individual pixel of the input image X according to the following equations:

$$\frac{x_{(r,s)1}\bar{x}_2^2}{x_{(r,s)2}\bar{x}_1^2},$$

$$\frac{x_{(r,s)1}\bar{x}_2^2 + \gamma}{x_{(r,s)2}\bar{x}_1^2 + \gamma},$$

$$\frac{(x_{(r,s)1} + \gamma)(\bar{x}_2 + \gamma)^2}{(x_{(r,s)2} + \gamma)(\bar{x}_1 + \gamma)^2}, \text{ or}$$

$x_{(r,s)1} - x_{(r,s)2} + 2\bar{x}_2 - 2\bar{x}_1$, or $\gamma(x_{(r,s)1} - x_{(r,s)2} + 2\bar{x}_2 - 2\bar{x}_1)$ for adjusting R components; and $$\frac{x_{(r,s)3}\bar{x}_2^2}{x_{(r,s)2}\bar{x}_3^2},$$

$$\frac{x_{(r,s)3}\bar{x}_2^2 + \gamma}{x_{(r,s)2}\bar{x}_3^2 + \gamma},$$

$$\frac{(x_{(r,s)3} + \gamma)(\bar{x}_2 + \gamma)^2}{(x_{(r,s)2} + \gamma)(\bar{x}_3 + \gamma)^2}, \text{ or}$$

$x_{(r,s)3} - x_{(r,s)2} + 2\bar{x}_2 - 2\bar{x}$, or $\gamma(x_{(r,s)3} - x_{(r,s)2} + 2\bar{x}_2 - 2\bar{x})$ for adjusting B components,
where $\gamma$ is a positive-valued parameter used to control the white balancing process.

16. A method for automatic white balancing of an input color filter array (CFA) single-sensor image, the method comprising the acts of using a processor to:
select pixels of the input image according to one or more predetermined criteria;
determine global spectral characteristics of the input image using color component-wise averaging of the selected pixels;
determine global gain values as a function of mean chrominance and luminance values;
determine local spectral characteristics of the input image using samples from a neighborhood of a pixel under consideration and estimating a local luminance component in chrominance locations;
determine local gain values as a function of the local luminance component and the pixel under consideration;
determine final gain values for the chrominance components of the input image based on contributions of the local and global gain values; and
produce a white-balanced output image by adjusting the input image components using the corresponding final gain values.

17. The method as recited in claim 16, wherein determining global gain values as a function of mean chrominance and luminance values comprises determining global gain values as a function of mean chrominance and luminance values according to the following equation:

$$\alpha_G(z) = \begin{cases} \bar{G}/\bar{R} & \text{for } R \text{ CFA locations} \\ \bar{G}/\bar{B} & \text{for } B \text{ CFA locations} \end{cases}$$

where:
z is the CFA image with pixels $z_{(r,s)}$;
r=1, 2, . . . , $K_1$;
s=1, 2, . . . , $K_2$;
$\bar{G}$ is the mean of $z_{(r,s)}$ entries located in G CFA locations selected according to one or more predetermined criteria;
$\bar{R}$ and $\bar{B}$ denote, respectively, the mean of $z_{(r,s)}$ entries located in R and B CFA locations selected according to one or more predetermined criteria.

18. The method as recited in claim 16, wherein local gain values as a function of the local luminance component and the pixel under consideration comprises local gain values as a function of the local luminance component and the pixel under consideration according to the following equation:

$\alpha_L(z) = z_{(r,s)}^L / z_{(r,s)}$ for R and B CFA locations where:

$$z_{(r,s)}^L = \frac{1}{|\theta|} \sum_{(i,j) \in \theta} z_{(i,j)}$$

is an estimated local luminance value;
$\theta$ denotes a set of CFA luminance locations in the neighborhood of (r,s); and
$|\theta|$ denotes the number of pixel locations in $\theta$.

19. The method as recited in claim 16, wherein producing a white-balanced output image by adjusting the input image components using the corresponding final gain values comprises producing a white-balanced output image by adjusting the input image components using the corresponding final gain values according to the following equation:

$$z_{(r,s)} = \begin{cases} \lambda z_{(r,s)}^L + (1-\lambda) z_{(r,s)} \bar{G}/\bar{R} & \text{for } R \text{ CFA locations} \\ \lambda z_{(r,s)}^L + (1-\lambda) z_{(r,s)} \bar{G}/\bar{B} & \text{for } B \text{ CFA locations} \\ z_{(r,s)} & \text{for } G \text{ CFA locations.} \end{cases}$$

20. The method as recited in claim 16, wherein producing a white-balanced output image by adjusting the input image components using the corresponding final gain values comprises producing a white-balanced output image by adjusting the input image components using the corresponding final gain values according to the following equation:

$$z_{(r,s)} = \begin{cases} f(z_{(r,s)}, \lambda g(z_{(r,s)}^L, z_{(r,s)}) + (1-\lambda)g(\bar{G}/\bar{R})) & \text{for } R \text{ CFA locations} \\ f(z_{(r,s)}, \lambda g(z_{(r,s)}^L, z_{(r,s)}) + (1-\lambda)g(\bar{G}/\bar{B})) & \text{for } B \text{ CFA locations} \\ z_{(r,s)} & \text{for } G \text{ CFA locations} \end{cases}$$

where $f(\cdot)$ denotes an adjustment operation and $g(\cdot)$ denotes a gain formulation.

21. One or more non-transitory computer-readable media having computer-readable instructions thereon which, when executed, implement a method for automatic white balancing of an input color filter array (CFA) single-sensor image, the method comprising the acts of:

selecting pixels of the input image according to one or more predetermined criteria;
determining global spectral characteristics of the input image using color component-wise averaging of the selected pixels;
determining global gain values as a function of mean chrominance and luminance values;
determining local spectral characteristics of the input image using samples from a neighborhood of a pixel under consideration and estimating a local luminance component in chrominance locations;
determining local gain values as a function of the local luminance component and the pixel under consideration;

determining final gain values for the chrominance components of the input image based on contributions of the local and global gain values; and producing a white-balanced output image by adjusting the input image components using the corresponding final gain values.

22. An image processing device comprising:
a processor; and
one or more computer-readable media as recited in claim 21, the one or more computer-readable media having computer-readable instructions thereon which are configured to be executed by the processor.

23. The image processing device as recited in claim 22, wherein the image processing device comprises a printer, a scanner, a digital camera, a digital camcorder, or a portable photo viewer, or some combination thereof.

* * * * *

UNITED STATES PATENT AND TRADEMARK OFFICE
CERTIFICATE OF CORRECTION

| | | |
|---|---|---|
| PATENT NO. | : 7,889,245 B2 | Page 1 of 1 |
| APPLICATION NO. | : 11/972435 | |
| DATED | : February 15, 2011 | |
| INVENTOR(S) | : Rastislav Lukac | |

It is certified that error appears in the above-identified patent and that said Letters Patent is hereby corrected as shown below:

Column 15, line 47, please insert --;-- after "vector"

Signed and Sealed this
Seventeenth Day of May, 2011

David J. Kappos
*Director of the United States Patent and Trademark Office*

UNITED STATES PATENT AND TRADEMARK OFFICE
CERTIFICATE OF CORRECTION

PATENT NO. : 7,889,245 B2
APPLICATION NO. : 11/972435
DATED : February 15, 2011
INVENTOR(S) : Rastislav Lukac It is certified that error appears in the above-identified patent and that said Letters Patent is hereby corrected as shown below:

Column 19, line 65, please correct

" $\alpha_L(z) = z_{(r,s)}{}^L / z_{(r,s)}$ for R and B CFA locations"

to -- $\alpha_L(z) = z^L_{(r,s)} / z_{(r,s)}$ for R and B CFA locations --.

Signed and Sealed this
Fourteenth Day of June, 2011

David J. Kappos
*Director of the United States Patent and Trademark Office*